Sept. 29, 1931. B. V. E. NORDBERG ET AL 1,824,833
POWER PLANT
Filed March 31, 1928 8 Sheets-Sheet 2

Inventors
Bruno V. E. Nordberg
Rudolph Wintzer
By
Attorneys

Sept. 29, 1931.  B. V. E. NORDBERG ET AL  1,824,833
POWER PLANT
Filed March 31, 1928   8 Sheets-Sheet 3

Inventors
Bruno V. E. Nordberg
Rudolph Wintzer
By
Attorneys

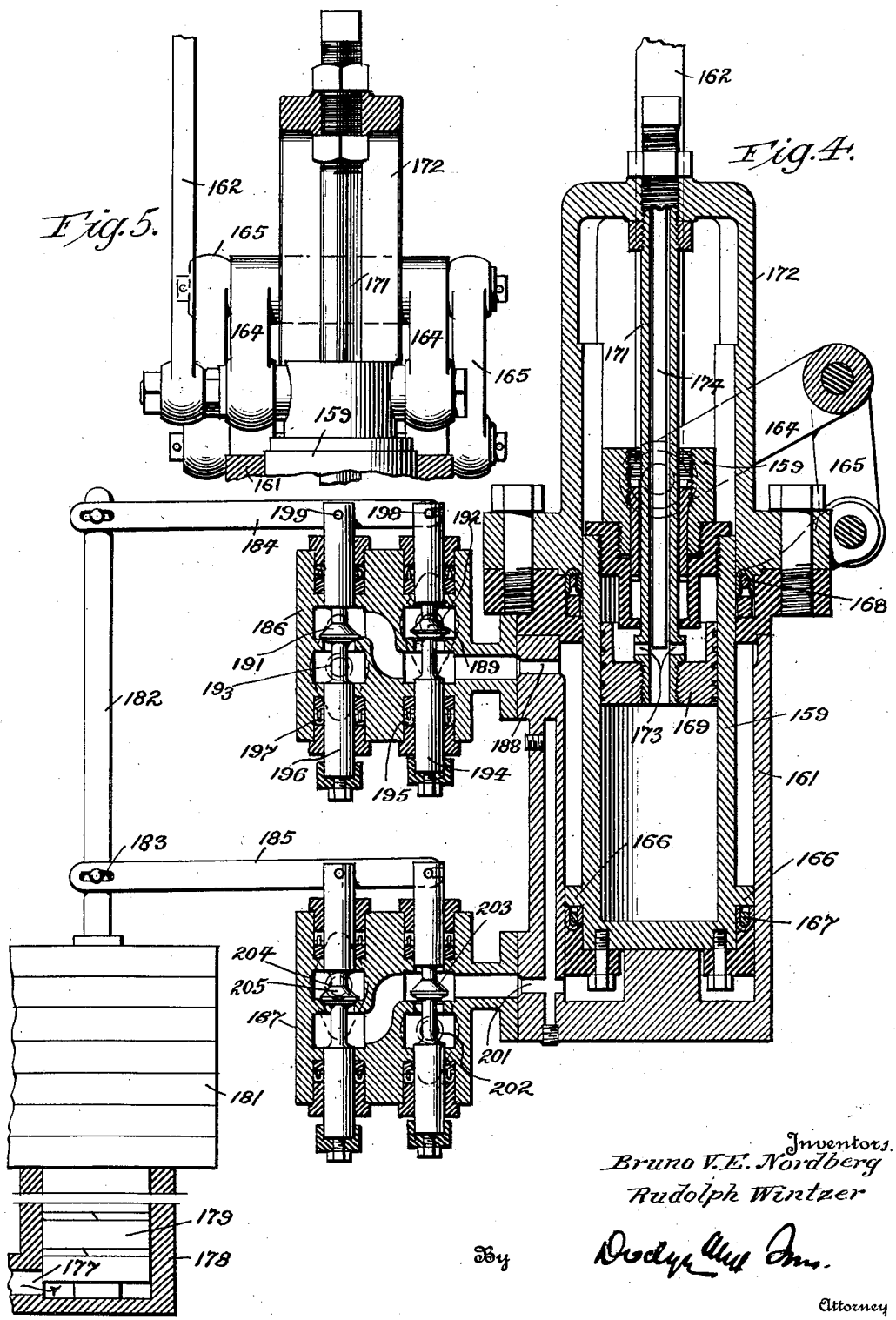

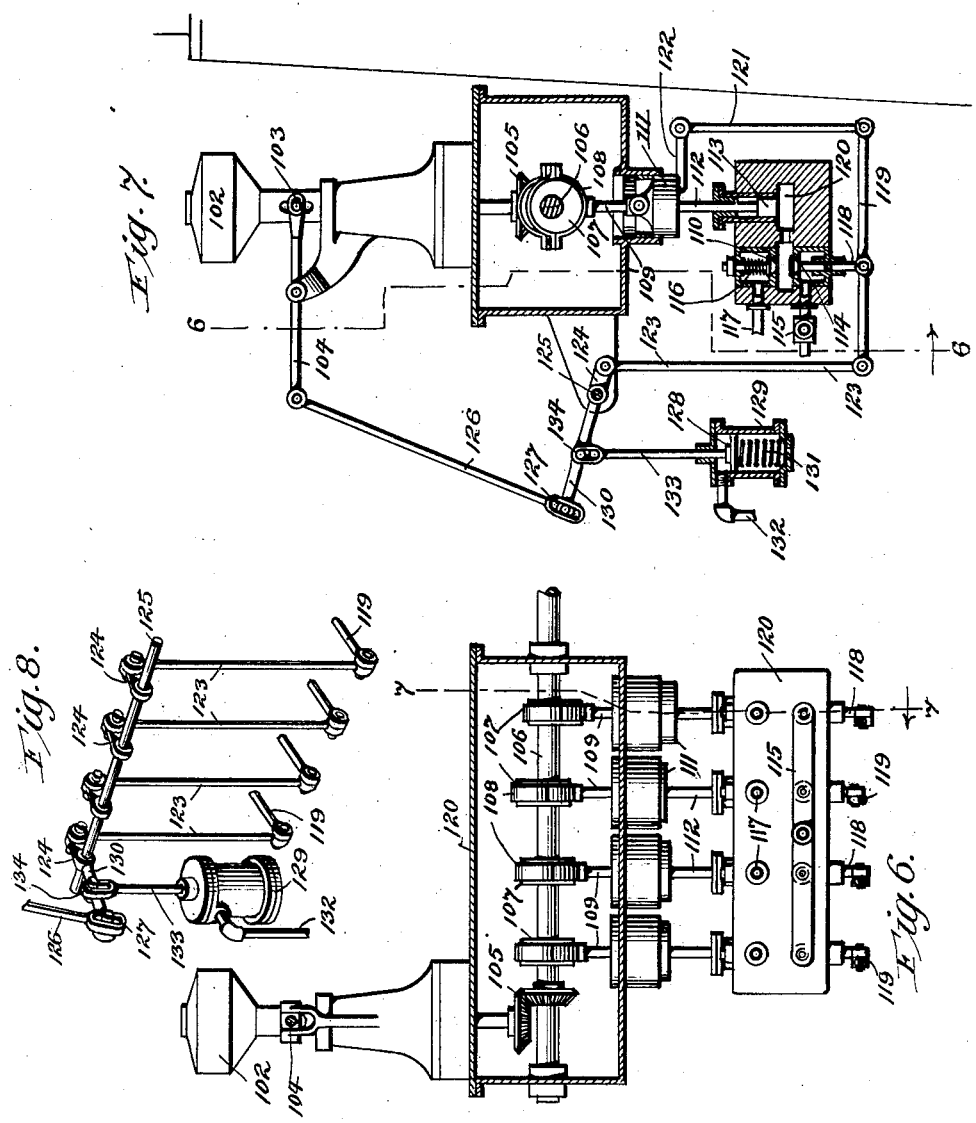

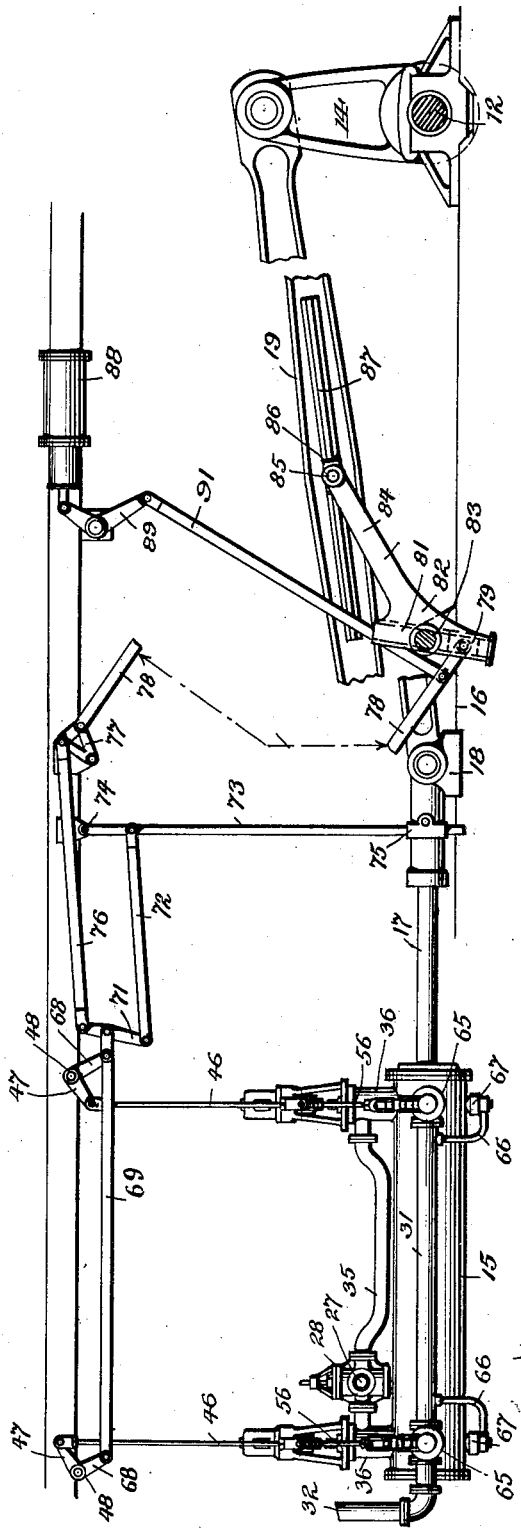

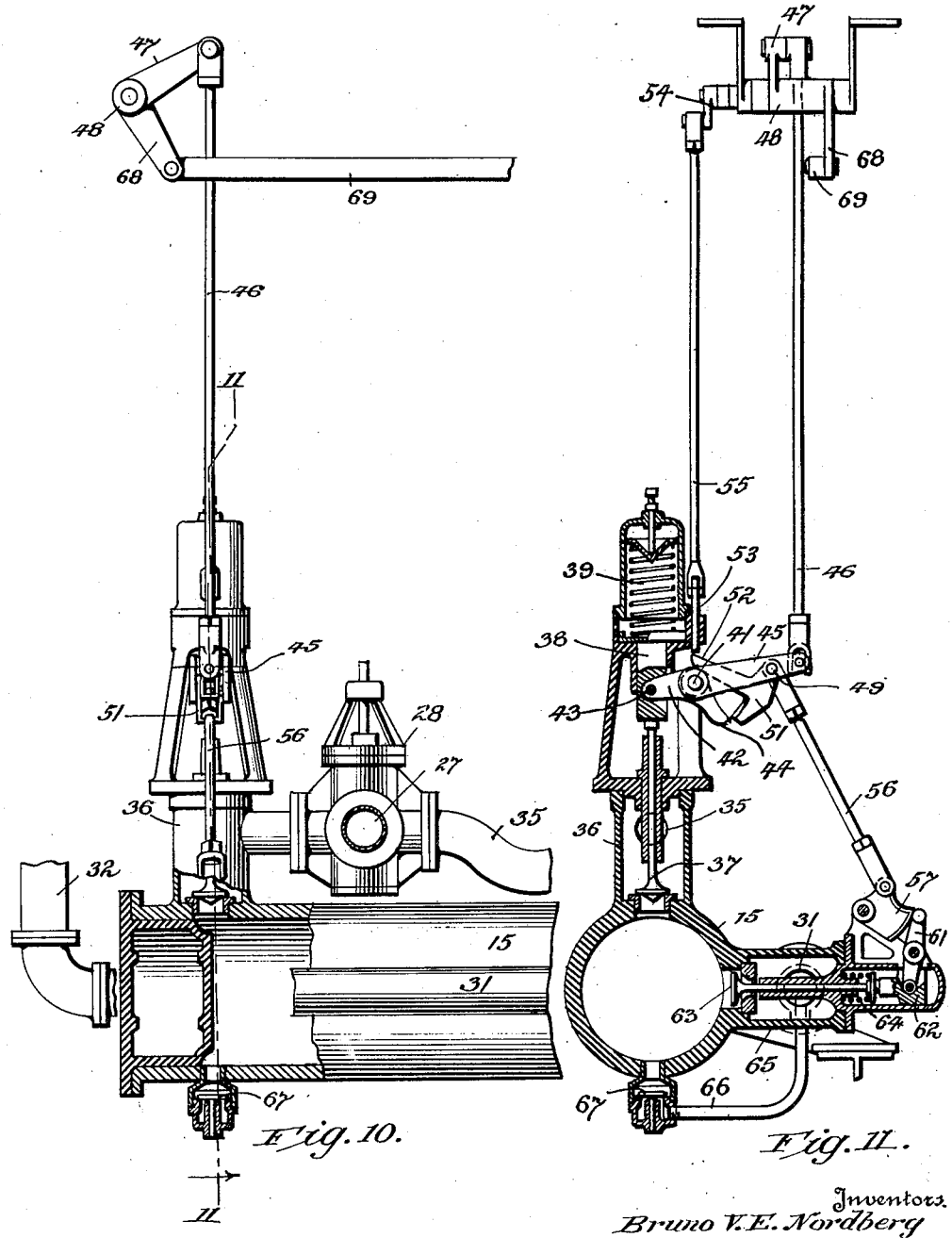

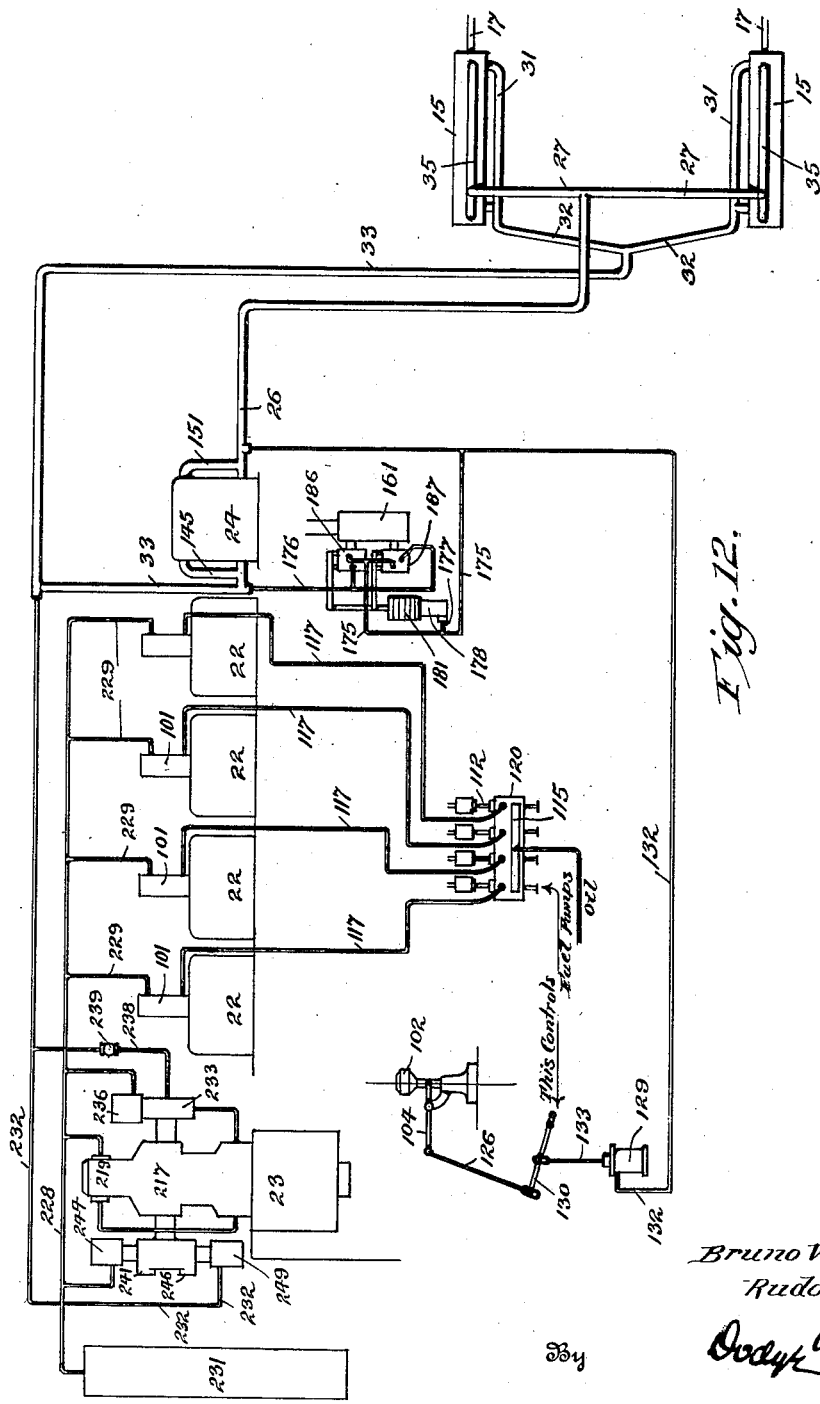

Patented Sept. 29, 1931

1,824,833

UNITED STATES PATENT OFFICE

BRUNO V. E. NORDBERG AND RUDOLPH WINTZER, OF MILWAUKEE, WISCONSIN, ASSIGNORS TO NORDBERG MANUFACTURING COMPANY, OF MILWAUKEE, WISCONSIN, A CORPORATION OF WISCONSIN

POWER PLANT

Application filed March 31, 1928. Serial No. 266,193.

This invention relates to power plants and more particularly to a special combination of prime mover and pneumatic transmission designed primarily to combine high efficiency attainable with Diesel engines, with efficient and flexible speed control and reversal.

Heretofore the usual practice has been to use a transmission of the electric type or of the hydraulic type where it was necessary to apply a Diesel engine to carry a load subject to widely varying speeds. It is possible, however, to secure better efficiency of transmission by means of a pneumatic transmission of special form than can be had by either the hydraulic transmission or the electric transmission, and at the same time to secure greater flexibility and ease of reversal. The term "pneumatic transmission" is intended to be generic rather than limiting and to include air and other gases or mixtures of gases.

Prior to this invention so-called "dense air" pneumatic transmissions having relatively small expansion ratios and operating in a closed cycle in which the lowest pressure in the system is above atmospheric, have been known. The purpose is to reduce the expansion ratio and consequently the temperature range of the air cycle with consequent freedom from frost troubles and to secure other advantages incidental to the use of a relatively dense medium. As an example of the contemplated pressure ranges it may be mentioned that a system in which the high pressure is of the order of 280 pounds per square inch gage and the low pressure is of the order of 80 pounds per square inch gage, gives satisfactory operating characteristics.

In any such system leakage of air will necessarily occur, and one of the features of the present invention is the derivation of the necessary make-up air from the high pressure multi-stage compressor forming a part of an air injection Diesel engine, and used to supply the air by which the fuel is injected into the cylinder. This air can be taken from the first or other stage of the compressor. Any such system requires some means which will insure that at any time when the compressor is subject to heavy demands for air for fuel injection purposes this demand shall have preference over the demand for make-up air, for it is obviously more important to insure satisfactory operation of the prime mover than to insure an absolutely constant maintenance of the chosen pressure in the transmission circuit. Means for accomplishing this are another feature of the present invention.

It will be understood, of course, that the high pressure compressor just mentioned is entirely distinct from the main compressor, preferably single stage, driven by the Diesel engine and used to absorb the power output of the engine by compressing the air which is used in the air motors. Starting, stopping and reversal requirements are met by the direct throttle and cut-off control of the air motors. This necessarily imposes a varying load on the main compressor and consequently on the prime mover, and an important feature of the present invention is the regulation of the Diesel engine and compressor in such a manner as to insure smooth and economical operation.

Generally stated, this control involves first the control of the amount of fuel fed to the Diesel engine cylinders. Such control is of a duplex character and is effected primarily in response to the pressure variations on the high pressure lines of the transmission system and secondarily by a speed governor which preferably takes control only to prevent overspeeding of the Diesel engine. In addition to the fuel control of the Diesel engine there is an unloading device for the main compressor which responds to pressure variations on the high pressure side of the transmission system and is so related to the Diesel engine control that when this has reached the minimum power (slow speed) setting, as a result of increasing pressure on the high pressure side of the transmission system, the unloading device will be brought into action to unload the compressor.

A system of this character is relatively simple to construct and is smooth and highly efficient in its operation.

Various other features of novelty and utility will be hereinafter disclosed in connection with the description of a preferred embodiment illustrated in the accompanying drawings.

In the drawings,—

Fig. 1 is a plan view of the after-part of a tow-boat, partly broken away showing the Diesel engine with its accessories and the compressors driven thereby (which form a unit with the engine) the air engines used to drive the stern wheel and the intervening connections.

Fig. 4 is an enlarged view in vertical section of the automatic mechanism which actuates the unloading mechanism.

Fig. 5 is a fragmentary side elevation of the upper portion of Fig. 4.

Fig. 6 is a sectional view of the fuel oil pump on the line 6—6 of Fig. 7 and showing the governor and pressure control connections.

Fig. 7 is a section on the line 7—7 of Fig. 6.

Fig. 8 is a fragmentary perspective view of the fuel pump controlling linkage.

Fig. 9 is a side elevation of the starboard side air engine showing its connection to the stern wheel crank, and its controlling valve gear. The port engine is essentially identical.

Fig. 10 is an enlarged view, partly broken away, to show the internal construction and showing the head end of the starboard engine.

Fig. 11 is a section on the line 11—11 of Fig. 10.

Fig. 12 is a piping diagram of the entire plant.

Figure 2:
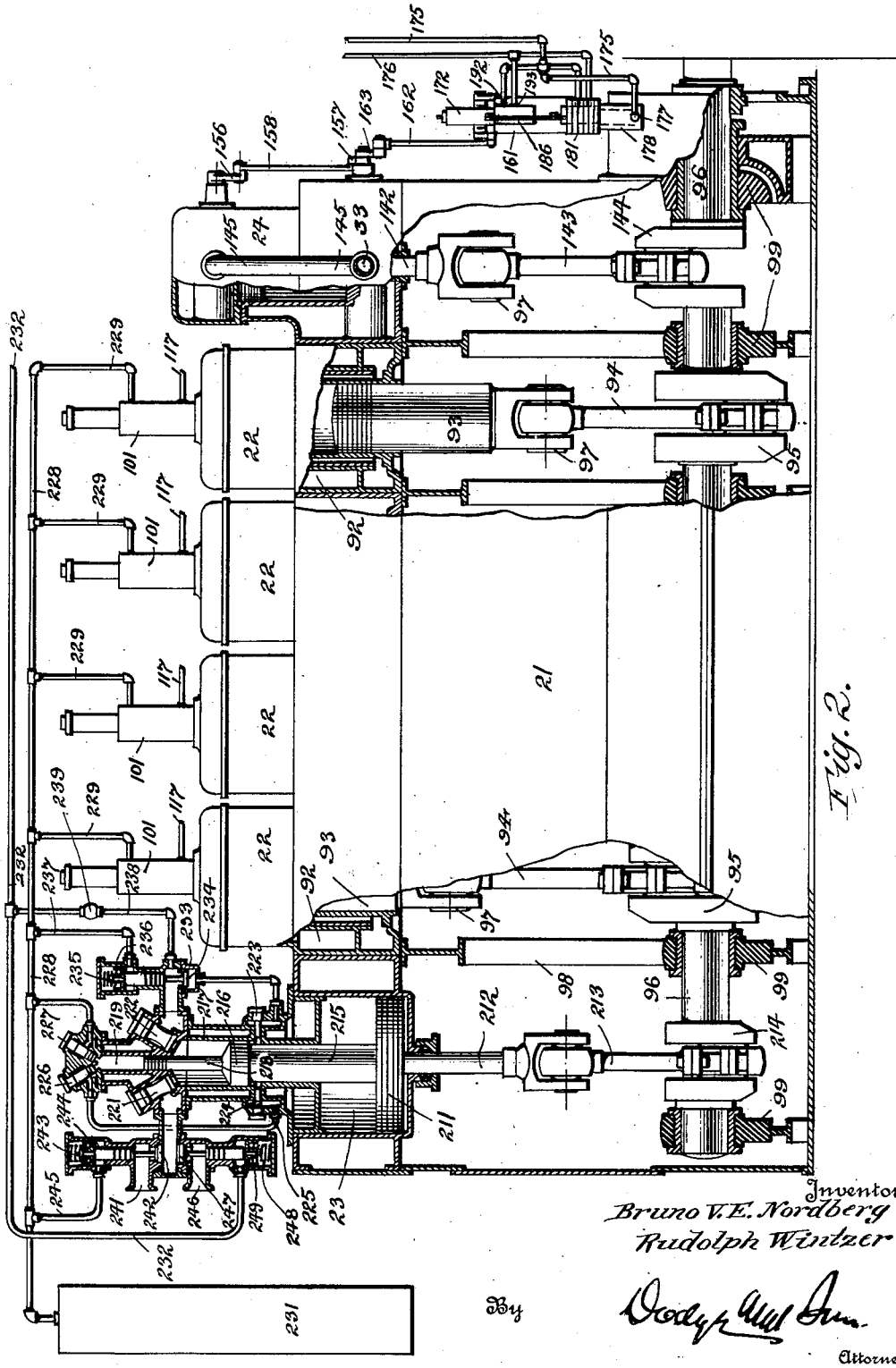
Fig. 2 is a side view of the four cylinder, two cycle air injection Diesel engine with certain parts, not essential to the present invention, omitted, and with other parts broken away to show the internal construction of the scavenging pump, the three-stage blast compressor, the power cylinders and the single-stage power transmitting compressor, all of which are built in one unit.

Referring first to Figs. 1 and 12, the main units will be identified after which they will be described in detail with reference to these and other figures.

The hull of a stern wheel tow-boat is indicated generally by the numeral 11, and the stern is at the right relatively to Fig. 1. 12 is a shaft on which the stern paddle wheel 13 is mounted, and this shaft 12 carries cranks 14 set quartering. The cranks 14 form parts of two simple air engines, the other main parts of which are identified as follows,—cylinder 15, cross head guides 16, piston rods 17, cross heads 18, connecting rods 19. The base structure of the Diesel engine is indicated at 21 and supports four internal combustion cylinders 22, a scavenging cylinder 23 and a single stage compressor cylinder 24, which last is the compressor end of the pneumatic power-transmitting system. The exhaust manifold of the Diesel engine is shown at 25.

The high pressure pipe of the closed pneumatic circuit is shown at 26. This pipe 26 has lateral branches 27 which lead to throttle valves 28 controlling the flow of compressed air to the cylinders 15. Beyond the branches 27 the exhaust manifold 25 is continued as an exhaust pipe 29.

The cylinders 15 are provided with exhaust manifolds 31 which are connected by branch pipes 32 and return line 33 to the suction side of compressor 24.

Referring now to Figs. 9, 10 and 11, in addition to Fig. 1, one of the two identical air engines will be described. The throttle valve 28 controls flow to an inlet manifold 35 leading to a head end inlet valve chest 36 and a crank end inlet valve chest 36. The inlet and exhaust valve mechanisms at the two ends of the cylinder are essentially the same, and a description of the head end mechanism will suffice.

In the chest 36 is an inlet valve 37 of the poppet type, whose stem is guided by a cross head 38 and urged in a valve closing direction by a spring 39. Any usual adjusting means are provided for varying the tension of the spring. Pivoted at 41 is a lever 42 which has a pin and slot connection 43 with the cross head 38. The lever 42 carries a latch nose 44 formed integral therewith. Also pivoted at 41 is a swinging arm 45 which is driven through a reach rod 46 by one arm 47 of an oscillating bell crank 48. The bell crank is driven in time with the engine by means hereinafter described. Pivoted at 49 to the arm 45 is a latch 51 which coacts with the latch nose 44 and which has a tail 52 projecting into contact with a vertically adjustable slide 53. The position of the slide 53 is determined by the setting of a bell crank 54, one arm of which is connected with the member 53 by a reach rod 55. There is a bell crank 54 for each end of the starboard cylinder and for each end of the port cylinder, and all four are connected together to be shifted in unison by any suitable means (not shown). A valve gear embodying the device in question is illustrated in the patent to Grieshaber, No. 1,735,045, November 12, 1929.

When the arm 45 swings downward the latch 51 engages the nose 44 and opens the valve 37 until collision of the tail 52 with the member 53 trips the latch 51 and allows the valve to close.

Connected to the arm 45 by a link 56 is a cam 57 which actuates, through a lever 61, a cross head 62. The cross head 62 actuates an exhaust valve 63 in an opening direction, the closing movement being effected by cylinder pressure assisted by spring 64. The valve 63 discharges into an exhaust bonnet 65 to which the exhaust manifold 31, heretofore mentioned, is connected. The exhaust manifold has branch connections 66 which lead to inwardly opening check valves 67 individually connected to the interior of the cylinder 15 near its ends. The purpose of using the check valves or snifter valves 67 is to prevent cylinder pressure from falling below exhaust pressure as it might do in the event of extremely short cut-offs.

The valves 67 are normally closed but should the working pressure in either working space fall below the return line pressure, i. e., the pressure in manifold 31, the corresponding valve 67 will open. Obviously this arrangement prevents inefficient operation under the conditions mentioned and is necessary to avoid situations which occasionally arise during the operation of such a system and which, if not obviated in this or some equivalent manner, will impose undesirable limitations on the design.

The other arm 68 of the bell crank 48 is operated through a reach rod 69 which is also connected to the arm 68 of a bell crank 48 at the crank end of the cylinder (see Fig. 9). It will be observed in Fig. 9 that the arms 47 of the two bell cranks 48 for the two ends of one cylinder are reversely arranged relatively to each other in order to give proper timing of the valves, as will be readily understood. The reach rod 69 is actuated by a reversing valve motion derived in part from the cross head 18 and in part from the connecting rod 19. Floating lever 71 is pinned between its ends to the reach rod 69 and its lower end is connected by a link 72 to a pendant lever 73 which is pivoted at 74 and has a combined pivoted and sliding connection 75 with the cross head 18. The upper end of the lever 71 is connected by a link 76, bell crank 77 and link 78 with the slide block 79 which may be shifted to either end of a guide 81 in the rocking member 82. Such motion carries the member 82 to either of two extreme positions on opposite sides of the pivot 83 on which the member 82 rocks. This member is rocked when the engine is in rotation by an arm 84 which is pinned at 85 to a slider 86 guided on a way 87 formed on the connecting rod 19. Thus as the crank 14 rotates the member 82 is rocked and the link 78 is reciprocated in one or another of two reverse relations to the cross head 18. The blocks 79 of both the port and starboard engines are shifted from one to another position to effect reversal by means of a servo-motor 88 acting through bell crank 89 and links 91. As stated the blocks 79 are positioned in either of their two extreme positions, there being no progressive adjustments between the forward and reverse settings.

In other words, the valve motion derived from the cross head and connecting rod is merely for the purpose of effecting reversal and not variable cut-off. The cut-off is varied by adjusting the bell cranks 54 for the head and crank ends of both engines in unison by any suitable means, as already suggested. It is immaterial to the invention just how this is effected beyond the fact that the adjustments of the two bell cranks 54 for the port and starboard engines are made simultaneously. Likewise the two throttle valves 28 for the port and starboard engines are simultaneously controlled.

The valve mechanism above described is not a feature of the present invention and various valve gears might be substituted. In the case of tow-boats such as here illustrated reversability and variable cut-off are desirable features and the purpose of the full illustration here given is to develop the possibility of embodying these features in a structure adapted to this particular field of use of the invention.

Referring now to Fig. 2, the four internal combustion cylinders 22 are of ordinary construction. Each cylinder 22 has a water jacket 92 and a trunk piston 93. These pistons are connected by connecting rods 94 of usual form with the cranks 95 on the main crank shaft 96 of the engine. The usual wrist pin is shown at 97, the frames are shown at 98 and the main bearings at 99. For purposes of description the engines will be understood to be of the familiar two-cycle air injection type with scavenging.

Each cylinder 22 is provided with an ordinary air injection fuel valve 101. The structure of these valves is not shown in detail, being familiar to those skilled in the art. It will be understood that each air injection valve includes a nozzle having a fuel oil connection and a high pressure blast air connection. The blast connections are controlled by the usual cam operated valves, not visible in the drawings, each of which is opened as the corresponding piston approaches the head end dead point. The fuel pumps are arranged to deliver the charge of fuel oil to the air injecting valve so that each valve is already charged with oil when the cam actuated blast controlling valve opens. The blast then injects the fuel charge into the cylinder against the high pressure existing therein. The conventional practice with such valves is to control the engine by varying the charge of fuel fed to each cylinder for each cycle of operation. The governing mechanism for varying the fuel charge is illustrated in Figs. 6, 7 and 8 and will now be described.

Governor 102 is an ordinary fly-ball governor which on increase of speed moves the collar 103 upward and swings lever 104 counterclockwise. The governor is driven by bevel gears 105 on extension 106 of the engine cam shaft. In a two-cycle engine, such as is here illustrated, the cam shaft turns at the same speed as the engine. The extension shaft 106 carries four eccentrics 107 angularly spaced to conform with the spacing of the cranks 95. Eccentric straps 108 with rods 109 connect the various eccentrics with corresponding cross heads 111. These cross heads drive, through rods 112 the plungers 113 of the four fuel pump cylinders 120, one corresponding to each Diesel engine cylinder. Each plunger 113 is thus reciprocated in a definitely timed relation with the piston 93 in the corresponding cylinder 22 of the Diesel engine so as to feed fuel oil to the air injecting valve 101 of that cylinder at the proper time. The fuel oil is drawn in by each plunger 113 past the corresponding poppet inlet valve 114 which is fed with fuel oil by a manifold 115 arranged to feed the four pumps for the four cylinders 22. The oil so drawn in is discharged to the corresponding air injecting valve through a discharge valve 110 loaded by a spring 116. The discharging flow occurs through pipes 117 which lead to the corresponding air injecting valves 101. Below, and in thrust relation with each inlet valve 114, is a plunger 118 and each plunger 118 is pivoted to a corresponding link 119, one end of which is connected by a corresponding link 121, with an extension 122 on the corresponding cross head 111. The other end of the link 119 is connected by a corresponding link 123 with a corresponding arm 124 which is fast on shaft 125. It follows from the above construction that as the cross heads 111 are reciprocated to operate the plungers 113 the plungers 118 are vertically reciprocated through a smaller range of motion. The effect is to hold the inlet valves 114 open through a portion of the downward stroke of each plunger 113. This action can be varied by varying the vertical position of link 123 as is done by turning shaft 125. The effect is to cause the plungers 113 to have a variable feed rate, because so long as the inlet valve 114 is held open the fuel oil previously drawn in through that valve by the upward movement of the plunger 113 will be discharged back through the inlet valve upon the downward movement of the plunger 113. Thus, until the valve 114 is allowed to close, no fuel oil is discharged through the discharge valve 110. If the inlet valve is allowed to close early in the downward stroke of plunger 113, more oil is discharged to the fuel valves 101 than if this closing occurs later. It therefore follows that the position of the shaft 125 determines the amount of fuel fed to the fuel blast nozzles 101, and consequently controls the speed of the engine. An arm 130 fast on shaft 125 is connected by link 126 with the arm 104, there being a lost motion pin and slot connection 127 so proportioned and adjusted that the governor 102 does not take control of the arm 130 and shaft 125 until the engine reaches the maximum permissible speed.

In other words, the governor is merely an overspeed preventing device. The normal control of the arm 130 and shaft 125 is effected by a piston 128 which is mounted in a cylinder 129 and which is urged downward against the resistance of a spring 131 by air pressure arriving through the pipe 132 from the high pressure transmission line 26. The piston 128 is not positively connected to the arm 130 but has a rod 133 terminating in a pin and slot connection 134 with arm 130.

In the normal operation of the device the rod 133 acts in tension to control the arm 130 but should the governor 102 respond to overspeed its connected link 126 may shift the arm 130 without obstruction by the piston rod 133.

Figure 3:
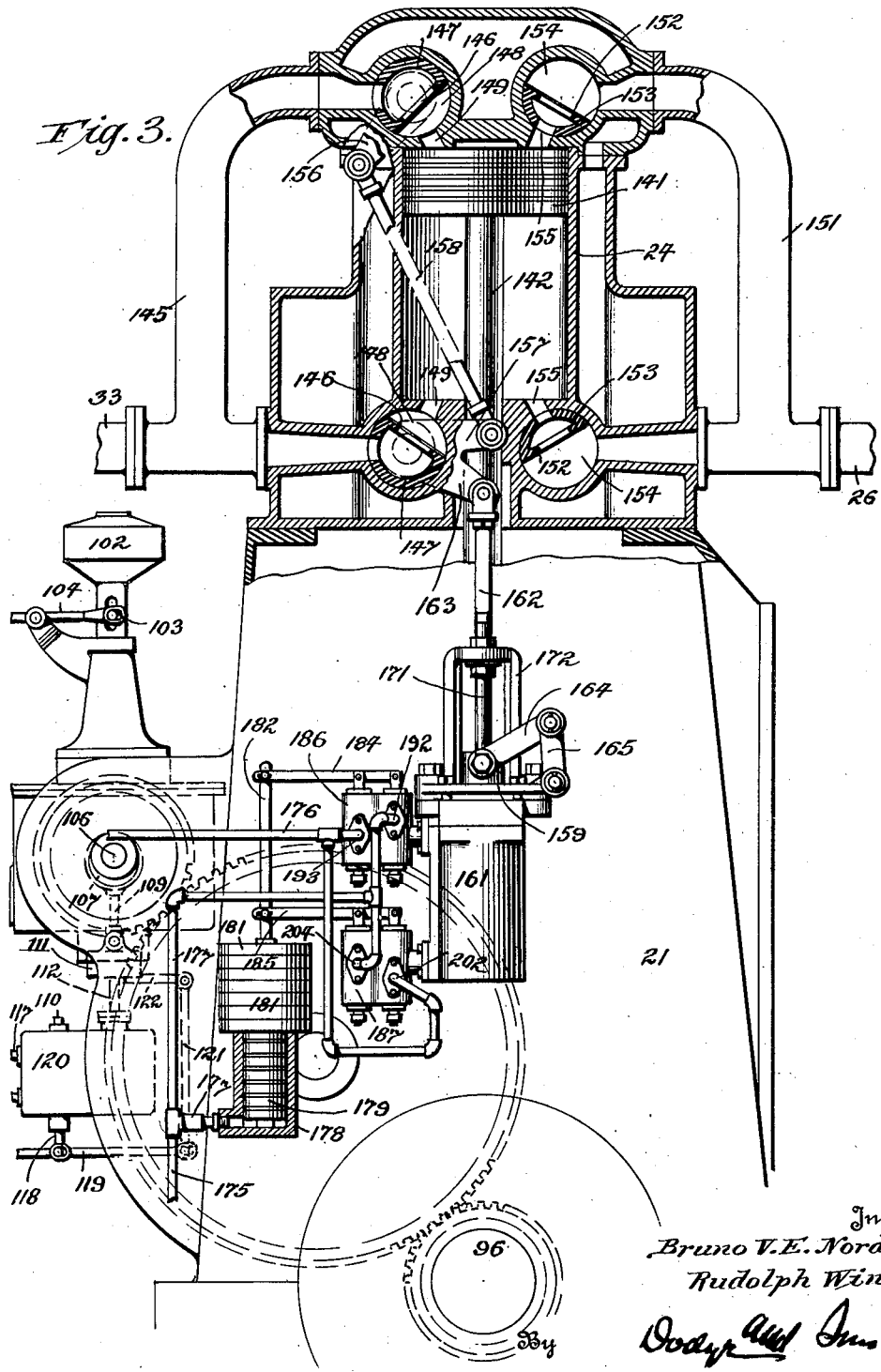
Fig. 3 is a view partly in elevation, and partly in section through the single-stage air compressor portion of the engine, showing the automatic unloading mechanism. This view also shows the general location of the engine governor and fuel pump not shown in Fig. 2.

The air compressor cylinder 24 is of the double-acting type and need not be jacketed, though it is shown jacketed in Fig. 3. It contains the usual piston 141 connected by a piston rod 142 and connecting rod 143 to the crank 144 formed on the main engine crank shaft 96. The air inlet connection 145 is connected to the low pressure line 33 and leads to the inlet valves 146 which are of the reed type illustrated in the patent to B. V. Nordberg, No. 1,570,392, January 19, 1926. These inlet reed valves are mounted in cylindrical sleeves 147 which are rotatable in cylindrical chambers 148 formed in the cylinder heads to receive them. Leading from the chambers 148 are the cylinder ports 149.

With the inlet valves in the position shown in Fig. 3 the reed valve structure 146 is interposed in the path of air flowing from the inlet connection 145 to the inlet ports 149, but the parts are so arranged that if the sleeves 147 are rotated, the head end sleeve clockwise and the crank end sleeve counterclockwise, a direct passage not controlled by the reed valves, is afforded from the inlet connection 145 to the cylinder ports 149. The effect of this is equivalent to holding the inlet valves open, that is, it unloads the compressor.

The discharge connection 151 leads directly to the high pressure line 26 (see Fig. 1). The discharge valves 152 are also of the reed type and are mounted in semi-cylindrical sleeves 153. These sleeves are mounted in chambers 154 in the cylinder heads but are not rotatable therein, from which it follows that the cylinder ports 155 communicate with the discharge connection 151 only through the discharge valves 152.

The sleeves 147 are connected with each other for rotation in relatively reverse directions by arms 156, 157, and link 158. They are actuated by plunger member 159 of a servo-motor whose cylinder is shown at 161.

The plunger 159 is connected by link 162 with an arm 163 formed on the lower sleeve 147 so that when the plunger 159 moves upward the sleeves 147 are moved in a direction to unload the compressor.

The servo-motor mechanism is shown more in detail in Figs. 4 and 5. The plunger 159 is guided and held against rotation by a forked yoke 164 pivoted thereto and to a pair of links 165 which in turn are pivoted on a portion of the cylinder 161. The plunger 159 is of the differential type and is urged upward by pressure fluid acting over its entire lower area. It is urged downward by pressure fluid acting on the annular area offered by a collar or projecting flange 166. The head of the plunger is sealed by cup-leathers 167 and the body of the plunger is sealed where it passes out of the cylinder 161 by cup-leathers 168.

In order to steady the movements of the plunger 159 this is made hollow to receive an internal piston head 169 which is supported by a tubular rod 171 from a yoke 172. The yoke 172 is supported on the cylinder 161. The tubular piston rod 171 has lateral ports 173 above the piston head 169 and these serve as a by-pass for oil which is contained in the plunger 159 and passes through the cylinder head 169 as the plunger 159 moves up and down. A rod 174 threaded into the upper end of the tubular piston rod 171 is adjustable axially to vary the effective area through the ports 173. The piston head 169 working within the plunger 159 thus serves as a checking device to prevent short erratic movements of the plunger 159.

Plunger 159 is actuated by air from the high pressure line 26. A valve mechanism is provided which will admit high pressure air to act in either desired direction on the plunger and simultaneously establish an opposed connection to the low pressure line 33. Thus the plunger 159 is caused to move in either direction to its limit of motion. The high pressure connecting line is shown at 175 and the low pressure connecting line at 176. The high pressure connection 175 has a branch 177 (see Figs. 3 and 12) which leads to the lower end of a cylinder 178 in which is a piston 179. This piston is single-acting and is urged downward by a plurality of weights 181. The weights 181 are so related to the spring 131 (see Fig. 7) that the weights 181 will not be lifted by the piston 179 until the spring 131 has been practically completely overpowered by piston 128. From this it follows that the feed of fuel oil to the cylinders 22 will have been reduced to the predetermined minimum before weight 181 moves upward. The weights 181 are mounted on piston rod 182 connected to the plunger 179 and the rod 182 has pin and slot connections 183 with two horizontal levers 184 and 185.

Lever 184 operates a combined inlet and discharge mechanism enclosed in a housing 186 and controlling the pressure which acts downward on the flange 166 and hence acts to move the plunger 159 downward, while lever 185 controls a similar but reversely arranged valve mechanism in a valve chest 187, and this valve mechanism controls the pressure which acts upwardly on the plunger 159. The two valve mechanisms are so related through their connection to the plunger 182, that when one valve mechanism establishes connection to the high pressure line 26 the other simultaneously establishes connection with the low pressure line 33.

As is clearly shown in Fig. 3 each of the connections 175 and 176 has branches extending to both of the valve housings 186, 187. In these valve housings are mounted two poppet valves seating downward, the low pressure controlling valve being subject to pressure in cylinder 161 on its upper side and pressure in low pressure connection 33 on its lower side, and the high pressure valve being subject to pressure in cylinder 161 on its lower side and pressure in high pressure connection 26 on its upper side. It follows that each has a closing tendency. They are opened in alternation with each other by the corresponding lever 184 or 185 which in opening one valve fulcrums about its connection with the other valve.

Referring first to the upper valve in Fig. 4, the cylinder port is shown at 188. The high pressure valve is shown at 189, the low pressure valve at 191. The high pressure connection is shown at 192 and the low pressure connection at 193. The valve 189 forms part of a plunger 194 which passes completely through the housing 186 and is sealed by cup-leathers 195. The valve 191 has a similar plunger 196 and cup-leathers 197. The plungers 194 and 196 are pivoted at 198 and 199 to the lever 184.

The valves mounted in housing 187 are identical in structure but are reversely arranged and it will therefore suffice to point out that the cylinder port is shown at 201, the low pressure connection at 202, the low pressure valve at 203, the high pressure connection at 204 and the high pressure valve at 205.

In Fig. 4 the parts are shown in position to load the compressor, that is, plunger 179 is in its lowermost position. High pressure valve 192 is open and low pressure valve 191 is closed, thus subjecting flange 166 to high pressure acting downward. At the same time low pressure valve 203 is open and high pressure valve 205 is closed, under which circumstances the lower end of plunger 159 is subjected to low pressure. The areas of the flange 166 and the total area of the plunger are so proportioned relatively to the high and low pressures that the total downward pressure predominates and the plunger 159 therefore assumes its lowermost position in which the inlet valves of the compressor are in their operative position. If high pressure rises to such a point that plunger 179 lifts the weights 181, the first effect of upward movement is to close high pressure valve 192 and low pressure valve 203. Continued movement then opens high pressure valve 205 and low pressure valve 191, establishing high pressure below the plunger 159 and low pressure above the flange 166, in which case plunger 159 moves to its upward limit of motion and unloads the compressor by turning the inlet valves to their inoperative position.

Other specifically different forms of servomotor might be substituted.

Turning now to Fig. 2, the scavenging cylinder 23 is an ordinary low pressure double-acting pump having a piston 211. The cylinder 23 is provided with ordinary automatic valves, which are not shown, and is connected to a low pressure manifold which delivers scavenging air to the various working cylinders 22 in a familiar manner. Piston 211 is driven through a rod 212 and connecting rod 213 through a crank 214 on the main shaft 96. Piston 211 is formed with a small trunk extension 215 which extends upward therefrom through the head of cylinder 23 and carries a piston head 216 of slightly larger diameter which acts as a differential piston in cylinder 217.

The space above the piston 216 within cylinder 217 is the first stage of the three-stage blast compressor, and the annular space below head 216 in cylinder 217 is the second stage compressor. Projecting from the plunger 216 is a smaller trunk plunger 218 which acts as a single-acting piston in the third stage cylinder 219. The inlet valve of the first stage is shown at 221 and the discharge valve at 222. The inlet valve of the second stage is shown at 223 and the discharge valve at 224.

From the discharge valve 224 a pipe connection 225 leads to the inlet valve 226 of the third stage. The discharge valve 227 of the third stage discharges into blast pipe 228 which has four branches 229, one leading to each of the fuel blast valves 101 corresponding to the four power cylinders 22. The blast line 228 is also connected to a fixed volume 231, known as the blast bottle, and serving merely as a high pressure reservoir for the storage of blast air. 232 is a branch line connected with the low pressure line 33.

The connection from the first stage exhaust valve 222 to the second stage inlet valve 223 is by way of a valve chest 233 in which is a valve 234 urged open by a spring 235 and urged close by a piston 236 which is subject to blast pressure fluid from the blast line 228 by a branch 237.

Between the first stage discharge valve 222 and the valve 234 is a branch connection 238 which leads by way of a check valve 239 to the low pressure line 232. The spring 235 is so chosen that when blast pressure in pipe 228 is adequate the valve 234 will be partially or wholly closed, thus tending to divert air through connection 238 and check valve 239 to the low pressure branch connection 232. Air thus diverted flows to the low pressure line 33 and serves as make-up air. On the other hand, if blast pressure is inadequate, spring 235 will overpower piston 236 and valve 234 will move in an opening direction.

Since the second stage inlet pressure is lower than the pressure in line 33, the second stage of the blast compression will take air in preference to the low pressure line at such times. It follows that make-up air may be supplied at any time by the first stage of the blast compressor when adequate blast pressure is available, and not otherwise. The three-stage blast compressor is controlled by controlling the inlet to its first stage. This inlet is provided with two branches, one of which is closed when blast pressure is maximum and the other of which is closed when the low pressure line is at proper pressure. It follows that a conjoint regulation is had and if no air were needed for either purpose the inlet to the blast compressor would be closed. Such a condition does not exist when the engine is running but the effect is to regulate the total inlet to the blast compressor in accordance with the total demand for air.

The inlet regulated by blast pressure is shown at 241 and is controlled by a poppet valve 242 which is urged open by a spring 243 and urged closed by a piston 244 subject to blast pressure arriving through branch 245.

The inlet regulated by low pressure line pressure is shown at 246 and is controlled by poppet valve 247. This valve is urged open by a spring 248 and is urged closed by a low pressure line pressure arriving by an extension of line 232 and acting against piston 249.

The arrangement just described is only one way of deriving make-up air from the blast compressor.

Broadly stated, the inventive concept here disclosed is the derivation of make-up air from some compressor forming a normal part of the internal combustion prime mover. In a more limited sense it is directed to derivation of this air from the air injecting blast compressor forming part of a Diesel engine of the air injection type, and more specifically still, its derivation from the first stage of such compressor.

Another important feature of the device is the mechanism by which the blast requirements are given preference over all make-up requirements.

The operation of the various mechanisms has been described in connection with the description of each mechanism and a general statement is all that now remains to be made.

Reversal of the engine is effected solely by shifting the block 79. Speed variation may be effected by throttle control or cut-off control, or both, but under normal conditions the air engine will be operated at full throttle and the speed will be controlled by varying the cut-off. The cut-off control is effected by shifting the adjustable members 53. Should it be necessary to use a very short cut-off the snifting valve 67 will prevent the cylinder pressure from passing below exhaust pressure.

Control of pressure in the high pressure line is effected, first, by regulating the fuel feed to the Diesel engine, and, second, when speed has been reduced to the desirable minimum by unloading the compressor. It is feasible to eliminate control of fuel by pressure and to rely solely on unloading of the compressor, but this would involve undesirable operating conditions occasioned by sudden and heavy load variations on the compressor and is not recommended.

Make-up air is fed to the air compressor line from the first stage of the blast compressor, but broadly considered, it is not essential that the make-up air be fed to the low pressure line as contradistinguished from the high pressure line, or that it be derived from any particular stage in the compressor. For economy it is desirable that it be taken from a stage whose discharge pressure is as high as and not materially higher than the pressure against which the make-up air is delivered. It is important that the make-up air should not be taken at such times or in such quantities as will deplete the blast supply and thus interfere with the proper feeding of fuel to the prime mover.

Within the limits above stated, it is obviously possible to embody the invention in various specifically different forms and such various embodiments are contemplated.

While the invention derives peculiar utility in connection with tow-boats, it is not limited in its utility to such field, but the invention may be applied to power plants generally, and particularly to various types of self-propelled vehicles. Obviously for certain of such uses a different type of air motor would be found desirable and it is specifically stated that the details of the air motor here chosen for illustration, are not essential to the invention, and that various other types might be used. Where the air motor has a variable cut-off the use of the snifting valve 67 is an important factor contributing to efficient operation throughout the entire range of cut-off.

What is claimed is,—

1. In a power plant, the combination of an internal combustion engine, including a compressor for furnishing compressed air used in the normal operation of the engine and capable of furnishing an excess of air; a power transmitting compressor and a pneumatic motor connected in a closed pneumatic circuit maintained above atmospheric pressure, said power transmitting compressor being driven by said engine; and means for supplying air compressed by the first-named compressor to said closed circuit to compensate for leakage therefrom.

2. In a power plant, the combination of an air injection Diesel engine having a compressor for injecting fuel into the working cylinders; a power-transmitting compressor and a pneumatic motor connected in a closed pneumatic circuit maintained above atmospheric pressure, said compressor being driven by said engine; and means for supplying air from the first named compressor to said circuit to compensate for leakage from the circuit.

3. In a power plant, the combination of an air injection Diesel engine having a compressor for injecting fuel into the working cylinders; a power-transmitting compressor and a pneumatic motor connected in a closed pneumatic circuit maintained above atmospheric pressure, said compressor being driven by said engine; and pressure responsive means for supplying air from the first named compressor to the low pressure side of said circuit to compensate for leakage from the circuit.

4. In a power plant, the combination of an air-injection Diesel engine having a multi-stage compressor for injecting fuel into the working cylinders; a power-transmitting compressor and a pneumatic motor connected in a closed circuit maintained above atmospheric pressure, said compressor being driven by said engine; and pressure responsive means for supplying air from the first stage of the first named compressor to said circuit to compensate for leakage from the circuit.

5. In a power plant, the combination of an air-injection Diesel engine, having a multi-stage compressor for furnishing air for fuel injection and a reservoir for storing said air; a power-transmitting compressor and a pneumatic motor connected in a closed pneumatic circuit maintained above atmospheric pressure, said compressor being driven by said engine; automatic means responsive to the pressure in said storage reservoir, and to the low pressure in said circuit, and serving to regulate the quantity of air compressed by the first named compressor; and automatic means responsive to the pressure in said storage reservoir and serving to divert air leaving one of the stages of the first named compressor to said circuit to compensate for leakage from the circuit.

6. In a power plant, the combination of an air-injection Diesel engine, having a compressor for furnishing air for fuel injection and a reservoir for storing said air; a power-transmitting compressor and a pneumatic motor connected in a closed pneumatic circuit maintained above atmospheric pressure, said compressor being driven by said engine; automatic means responsive to the pressure in said storage reservoir, and to the low pressure in said circuit, and serving to regulate the quantity of air compressed by the first named compressor; and automatic means responsive to the pressure in said storage reservoir and serving to divert air from the first named compressor to said circuit to compensate for leakage from the circuit.

7. In a power plant, the combination of an air-injection Diesel engine, having a compressor for furnishing air for fuel injection and a reservoir for storing said air; a power-transmitting compressor and a pneumatic motor connected in a closed pneumatic circuit maintained above atmospheric pressure, said compressors being driven by said engine; automatic means responsive to the pressure in said storage reservoir, and to the low pressure in said circuit, and serving to regulate the quantity of air compressed by the first named compressor; and automatic means responsive to the pressure in said storage reservoir and serving to divert air from the first named compressor to the low pressure side of said circuit to compensate for leakage from the circuit.

8. In a power plant, the combination of an air-injection Diesel engine, having a multi-stage compressor for furnishing air for fuel injection and a reservoir for storing said air; a power transmitting compressor; a pneumatic motor; a pneumatic circuit having a high pressure line and a low pressure line connecting said power transmitting compressor and motor, the low pressure line being maintained at a pressure above atmospheric and slightly above the intake pressure of the second stage of the multi-stage compressor; a valve for throttling the connection from the first to the second stage of the multi-stage compressor; a loaded piston subject to storage pressure for closing said valve; and a check valve controlling flow to the low pressure line from a point between the first stage discharge and said throttling valve.

9. In a power plant, the combination of an air-injection Diesel engine, having a multi-stage compressor for furnishing air for fuel injection and a reservoir for storing said air; a power transmitting compressor; a pneumatic motor; a pneumatic circuit having a high pressure line and a low pressure line connecting said power transmitting compressor and motor, the low pressure line being maintained at a pressure above atmospheric and slightly above the intake pressure of the second stage of the multi-stage compressor; a valve for throttling the connection from the first to the second stage of the multi-stage compressor; a loaded piston subject to storage pressure for closing said valve; a check-valve controlling flow to the low pressure line from a point between the first stage discharge and said throttling valve; two inlets to the first stage of said multi-stage compressor; and normally open pressure responsive valves, each controlling one of said inlets, one urged in a closing direction by pressure in the low pressure line, and the other urged in a closing direction by pressure in said storage reservoir.

10. In a power plant, the combination of an internal combustion engine; a compressor driven thereby; a pneumatic motor; a high pressure line connecting the compressor with said motor; and automatic governing means responsive to the pressure in the high pressure line and serving first to diminish the fuel fed to the engine as said pressure rises, until a desired minimum fuel feed rate is reached, and then to unload the compressor.

11. In a power plant, the combination of an internal combustion engine; a compressor driven thereby; a pneumatic motor; a high pressure line connecting the compressor with said motor; automatic governing means responsive to the pressure in the high pressure line and serving first to diminish the fuel fed to the engine as said pressure rises, until a desired minimum fuel feed rate is reached, and then to unload the compressor; and a governor responsive to engine speed and operating independently of said pressure responsive means to diminish the fuel fed to the engine when the engine exceeds a chosen limiting speed.

12. In a power plant, the combination of a Diesel engine; a compressor driven thereby; a pneumatic motor; a high pressure line connecting the compressor with the motor; a variable feed fuel pump device connected to feed said engine; an unloading device for said compressor; and automatic means responsive to the pressure in said high pressure line, and operating upon increase of pressure first to reduce the feed rate of said fuel pump device, and then to operate said unloading device.

13. In a power plant, the combination of a Diesel engine; a compressor driven thereby; a pneumatic motor; a high pressure line connecting the compressor with the motor; a variable feed fuel pump device connected to feed said engine; an unloading device for said compressor; automatic means responsive to the pressure in said high pressure line, and operating upon increase of pressure first to reduce the feed rate of said fuel pump device, and then to operate said unloading device; and a governor responsive to engine speed, and connected with said fuel pump device to diminish the feed rate thereof when the engine exceeds a chosen limiting speed.

14. In a power plant, the combination of a Diesel engine; a compressor driven thereby; a pneumatic motor; a high pressure line connecting the compressor with the motor; a variable feed fuel pump device connected to feed said engine; an unloading device for said compressor; a spring loaded piston subject to the pressure in said high pressure line, and connected with said variable feed fuel pump device to diminish progressively the rate of fuel feed as said pressure rises; and a second loaded piston also subject to the pressure in said high pressure line and connected to actuate said unloading device substantially at the time the spring loaded piston reaches its limit of motion against the opposition of its loading spring.

15. In a power plant, the combination of a Diesel engine; a compressor driven thereby; a pneumatic motor; a high pressure line connecting the compressor with the motor; a variable feed fuel pump device connected to feed said engine; an unloading device for said compressor; a spring loaded piston subject to the pressure in said high pressure line and connected with said variable feed fuel pump device to diminish progressively the rate of fuel feed as said pressure rises; a second loaded piston also subject to the pressure in said high pressure line and connected to actuate said unloading device substantially at the time the spring loaded piston reaches its limit of motion against the opposition of its loading spring; a governor responsive to engine speed; and a lost motion connection between said governor and said fuel feed pump device, arranged to cause the governor to reduce the fuel feed rate when the engine reaches a chosen limiting speed.

16. In a power plant, the combination of a Diesel engine; a compressor driven thereby; a pneumatic motor; a high pressure line connecting the compressor with the motor; a variable feed fuel pump device connected to feed said engine; an unloading device for said compressor including rotatable sleeves and automatic inlet valves mounted therein, the rotation of said sleeves serving alternately in two different positions to interpose said inlet valves in the inlet passages of said compressor or to afford a by-pass around said inlet valves; and automatic means responsive to the pressure in said high pressure line and operating upon increase of pressure first to reduce the feed rate of said fuel pump device and then to rotate said sleeves to the last named position.

17. In a power plant, the combination of a Diesel engine; a compressor driven thereby; a pneumatic motor; a high pressure line and a low pressure line connecting the compressor and the motor in a closed pneumatic circuit; a variable feed fuel pump device connected to feed said engine; means for unloading said compressor; a motor for actuating said unloading means in reverse directions, including a double-acting piston and valve means operable to admit air from the high pressure line against either side of said piston selectively and at the same time to connect the other side of said piston with the low pressure line; a spring loaded piston subject to the pressure in said high pressure line and connected with said variable feed fuel pump device to diminish progressively the rate of fuel feed as said pressure rises; and a second loaded piston also subject to the pressure in said high pressure line and connected to actuate said valve means substantially at the time said spring loaded piston reaches its limit of motion against the opposition of its loading spring.

18. In a power plant, the combination of an air-injection Diesel engine having a compressor for injecting fuel into the working cylinders; a power transmitting compressor; a pneumatic motor; a high pressure line and a low pressure line connecting the power transmitting compressor and the motor in a closed pneumatic circuit; a variable feed fuel pump device connected to feed said engine; means for unloading said power transmitting compressor; a motor for actuating said unloading means in reverse directions, including a double-acting piston and valve means operable to admit air from the high pressure line against either side of said piston selectively and at the same time to connect the other side of said piston with the low pressure line; a spring loaded piston subject to the pressure in said high pressure line and connected with said variable feed fuel pump device to diminish progressively the rate of fuel feed as said pressure rises; a second loaded piston also subject to the pressure in said high pressure line and connected to actuate said valve means substantially at the time said spring loaded piston reaches its limit of motion against the opposition of its loading spring; and means for supplying air from the first named compressor to said low pressure line to compensate for leakage.

19. In a power plant, the combination of a Diesel engine; a compressor driven thereby; a variable cut-off pneumatic motor; a high pressure line connecting the compressor with the motor; and means for causing the Diesel engine and compressor to develop an output commensurate with the output of the pneumatic motor, comprising an automatic device controlling gradually the fuel feed to the engine and an unloading device for said compressor responsive to pressure in the high pressure line and arranged to operate only upon the occurrence of excessive pressure therein.

20. In a power plant, the combination of a Diesel engine; a compressor driven thereby; a pneumatic motor having a variable cutoff for controlling its power output; a high pressure line connecting the compressor with said motor; a variable feed fuel pump device connected to feed said Diesel engine; an unloading device for said compressor; and automatic means responsive to the pressure in said high pressure line and operating upon increase of pressure therein first to reduce the feed rate to said fuel pump device progressively to the minimum and then to operate said unloading device.

21. In a power plant, the combination of a Diesel engine; a compressor driven thereby; a pneumatic motor having a variable cut-off for controlling its power output; a high pressure line connecting the compressor with said motor; a variable feed fuel pump device connected to feed said Diesel engine; an unloading device for said compressor; automatic means responsive to the pressure in said high pressure line and operating upon increase of pressure therein first to reduce the feed rate to said fuel pump device progressively to the minimum and then to operate said unloading device; and a governor responsive to engine speed and connected to control said fuel pump device, said governor being arranged to take control when the engine exceeds a chosen limiting speed.

22. In a power plant, the combination of a Diesel engine of an air-injection type, including a compressor for supplying the fuel-injecting air; a power transmitting compressor driven thereby; a pneumatic motor; a high pressure line and a low pressure line connecting the power transmitting compressor and the motor in a closed pneumatic circuit; a variable feed fuel pump device connected to feed said engine; an unloading device for said power transmitting compressor; automatic means responsive to the pressure in said high pressure line and operating upon increase of pressure first progressively to reduce the feed rate of said fuel pump to approximately the minimum setting and then to operate said unloading device; and automatic means responsive at least in part to pressure in said circuit for diverting air compressed by the first named compressor to the low pressure line to compensate for leakage from the pneumatic circuit.

23. In a power plant, the combination of a Diesel engine of an air-injection type, including a compressor for supplying the fuel-injecting air; a power transmitting compressor driven thereby; a pneumatic motor; a high pressure line and a low pressure line connecting the power transmitting compressor and the motor in a closed pneumatic circuit; a variable feed fuel pump device connected to feed said engine; an unloading device for said power transmitting compressor; automatic means responsive to the pressure in said high pressure line and operating upon increase of pressure first progressively to reduce the feed rate of said fuel pump to approximately the minimum setting and then to operate said unloading device; pressure responsive means for diverting air compressed by the first named compressor to the low pressure line to compensate for leakage from the pneumatic circuit; and a governor responsive to engine speed and having a lost motion connection with said fuel pump device whereby the speed responsive governor is normally inactive but operates to prevent engine speed from passing a chosen maximum.

24. A power plant for tow-boats, comprising a Diesel engine of the air-injection type including a compressor for supplying fuel-injecting air; a power transmitting compressor driven by said engine; a variable cut-off reversible pneumatic motor; a high pressure line and a low pressure line connecting the power transmitting compressor and the motor in a closed pneumatic circuit operating above atmospheric pressure; a variable feed fuel pump device connected to feed said engine; an unloading device for said power transmitting compressor; automatic means responsive to the pressure in said high pressure line, and operating upon increase of pressure to reduce the feed rate of said fuel pump device and then to operate said unloading device; and pressure responsive means for feeding air from the first named compressor to the pneumatic circuit to compensate for leakage.

25. A power plant for tow-boats, comprising a Diesel engine of the air-injection type including a compressor for supplying fuel injecting-air; a storage reservoir for said air; a power transmitting compressor driven by said engine; a variable cut-off reversible pneumatic motor; a high pressure line and a low pressure line connecting the power transmitting compressor and the motor in a closed pneumatic circuit operating above atmospheric pressure; a variable feed fuel pump device connected to feed said engine; an unloading device for said power transmitting compressor; automatic means responsive to the pressure in said high pressure line, and operating upon increase of pressure to reduce the feed rate of said fuel pump device and then to operate said unloading device; means for feeding air from the first named compressor to the pneumatic circuit to compensate for leakage; and two automatic means, one responsive to the pressure of air storage and the other responsive to pressure in the low pressure line, for controlling the quantity of air compressed by the first named compressor.

In testimony whereof we have signed our names to this specification.

BRUNO V. E. NORDBERG.
RUDOLPH WINTZER.